(12) United States Patent
Manevich et al.

(10) Patent No.: US 12,669,843 B2

(45) Date of Patent: Jun. 30, 2026

(54) CLOCK SYNCHRONIZATION MONITORING SYSTEM

(71) Applicant: Mellanox Technologies, Ltd., Yokneam (IL)

(72) Inventors: Natan Manevich, Nesher (IL); Dotan David Levi, Kiryat Motzkin (IL); Wojciech Wasko, Młynek (PL); Maciej Machnikowski, Reda (PL)

(73) Assignee: Mellanox Technologies, Ltd, Yokneam (IL)

( * ) Notice: Subject to any disclaimer, the term of this patent is extended or adjusted under 35 U.S.C. 154(b) by 77 days.

(21) Appl. No.: 18/349,976

(22) Filed: Jul. 11, 2023

(65) Prior Publication Data

US 2025/0021130 A1     Jan. 16, 2025

(51) Int. Cl.
G06F 1/12 (2006.01)

(52) U.S. Cl.
CPC ...................................... G06F 1/12 (2013.01)

(58) Field of Classification Search
CPC .......................................................... G06F 1/08
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,864,315 A | 1/1999 | Welles et al. |
| 5,896,524 A | 4/1999 | Halstead, Jr. et al. |

(Continued)

FOREIGN PATENT DOCUMENTS

| | | |
|---|---|---|
| AU | 2023200522 B1 | 4/2023 |
| CN | 106817183 A | 6/2017 |

(Continued)

OTHER PUBLICATIONS

IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

(Continued)

*Primary Examiner* — Phil K Nguyen

(74) *Attorney, Agent, or Firm* — Meitar Patents LTD.; Daniel Kligler

(57) ABSTRACT

In one embodiment, a system including a reference processing device includes a reference hardware clock to maintain a reference clock value, and reference clock synchronization circuitry to discipline the reference hardware clock responsively to a remote clock, which is remote to the system, and a follower processing device including a follower hardware clock to maintain a follower clock value, and follower clock synchronization circuitry to synchronize the follower hardware clock to the reference hardware clock, and provide an indication about the follower clock value to the reference processing device, wherein the reference clock synchronization circuitry is configured to monitor a quality of the synchronization of the follower hardware clock to the reference hardware clock.

33 Claims, 9 Drawing Sheets

(56) References Cited

U.S. PATENT DOCUMENTS

| | | |
|---|---|---|
| 6,055,246 A | 4/2000 | Jones |
| 6,081,143 A | 6/2000 | Ho et al. |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng |
| 8,930,647 B1 | 1/2015 | Smith |
| 9,344,265 B1 | 5/2016 | Karnes |
| 9,397,960 B2 | 7/2016 | Arad et al. |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,637,776 B2 | 4/2020 | Iwasaki |
| 10,727,966 B1 | 7/2020 | Zenberg et al. |
| 10,778,361 B1 | 9/2020 | Almog et al. |
| 10,778,406 B2 | 9/2020 | Gaist et al. |
| 10,841,243 B2 | 11/2020 | Levi et al. |
| 10,879,910 B1 | 12/2020 | Franck et al. |
| 10,887,077 B1 | 1/2021 | Ivry |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 11,539,451 B2 | 12/2022 | Herber et al. |
| 11,552,871 B2 | 1/2023 | Sela et al. |
| 11,606,157 B1 | 3/2023 | Wasko et al. |
| 11,706,014 B1 | 7/2023 | Manevich et al. |
| 11,770,236 B2 | 9/2023 | Moon |
| 11,907,754 B2 | 2/2024 | Wasko et al. |
| 11,962,492 B2 | 4/2024 | Park et al. |
| 12,289,389 B2 | 4/2025 | Manevich et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0100054 A1 | 5/2005 | Scott et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0131766 A1 | 5/2015 | Chen et al. |
| 2015/0156072 A1 | 6/2015 | Kirrmann |
| 2015/0163050 A1 | 6/2015 | Han et al. |
| 2015/0318941 A1 | 11/2015 | Zheng et al. |
| 2015/0372681 A1 | 12/2015 | Melanson et al. |
| 2016/0057518 A1 | 2/2016 | Neudorf |
| 2016/0072602 A1 | 3/2016 | Earl et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0299221 A1 | 10/2016 | Bushnell et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0127364 A1 | 5/2017 | Shibuta et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0287725 A1 | 10/2018 | Rabinovich et al. |

(56) References Cited

U.S. PATENT DOCUMENTS

| | | | |
|---|---|---|---|
| 2018/0309654 A1 | 10/2018 | Achkir et al. | |
| 2018/0321358 A1 | 11/2018 | Carswell et al. | |
| 2019/0007189 A1 | 1/2019 | Hossain et al. | |
| 2019/0014526 A1 | 1/2019 | Bader et al. | |
| 2019/0089615 A1 | 3/2019 | Branscomb et al. | |
| 2019/0149258 A1 | 5/2019 | Araki et al. | |
| 2019/0158909 A1 | 5/2019 | Kulkarni et al. | |
| 2019/0196563 A1 | 6/2019 | Lai | |
| 2019/0273571 A1 | 9/2019 | Bordogna et al. | |
| 2019/0319729 A1 | 10/2019 | Leong et al. | |
| 2019/0349392 A1 | 11/2019 | Wetterwald et al. | |
| 2019/0379714 A1 | 12/2019 | Levi et al. | |
| 2020/0162234 A1 | 5/2020 | Almog et al. | |
| 2020/0235905 A1 | 7/2020 | Su et al. | |
| 2020/0266967 A1 | 8/2020 | Fisher et al. | |
| 2020/0287557 A1 | 9/2020 | Horovitz et al. | |
| 2020/0304224 A1 | 9/2020 | Neugeboren | |
| 2020/0331480 A1 | 10/2020 | Zhang et al. | |
| 2020/0344333 A1 | 10/2020 | Hawari et al. | |
| 2020/0396050 A1 | 12/2020 | Perras et al. | |
| 2020/0401434 A1 | 12/2020 | Thampi et al. | |
| 2021/0141413 A1 | 5/2021 | Levi et al. | |
| 2021/0167881 A1 | 6/2021 | Zinner et al. | |
| 2021/0218431 A1 | 7/2021 | Narayanan et al. | |
| 2021/0243140 A1 | 8/2021 | Levi et al. | |
| 2021/0288785 A1 | 9/2021 | Faig et al. | |
| 2021/0297151 A1 | 9/2021 | Levi et al. | |
| 2021/0297230 A1 | 9/2021 | Dror et al. | |
| 2021/0314078 A1 | 10/2021 | Zinner | |
| 2021/0318978 A1 | 10/2021 | Hsung | |
| 2021/0328900 A1 | 10/2021 | Sattinger et al. | |
| 2021/0392065 A1 | 12/2021 | Sela et al. | |
| 2021/0409031 A1 | 12/2021 | Ranganathan et al. | |
| 2021/0409137 A1 | 12/2021 | Mula et al. | |
| 2022/0006606 A1 | 1/2022 | Levi et al. | |
| 2022/0021393 A1 | 1/2022 | Ravid et al. | |
| 2022/0045768 A1 | 2/2022 | Cingoz et al. | |
| 2022/0066978 A1 | 3/2022 | Mishra et al. | |
| 2022/0086105 A1 | 3/2022 | Levi et al. | |
| 2022/0116473 A1 | 4/2022 | Levi et al. | |
| 2022/0121691 A1 | 4/2022 | Barathi | |
| 2022/0173741 A1 | 6/2022 | Ravid et al. | |
| 2022/0191275 A1 | 6/2022 | Levi et al. | |
| 2022/0224500 A1 | 7/2022 | Mula et al. | |
| 2022/0239549 A1 | 7/2022 | Zhao et al. | |
| 2022/0240108 A1 | 7/2022 | Ruelke et al. | |
| 2022/0337683 A1 | 10/2022 | Biederman et al. | |
| 2022/0342086 A1 | 10/2022 | Yoshida | |
| 2022/0352998 A1 | 11/2022 | Levi et al. | |
| 2022/0357763 A1 | 11/2022 | Levy et al. | |
| 2022/0360423 A1 | 11/2022 | Levi et al. | |
| 2022/0385598 A1 | 12/2022 | Pismenny et al. | |
| 2022/0416925 A1 | 12/2022 | Levi et al. | |
| 2023/0077631 A1 | 3/2023 | Biederman et al. | |
| 2023/0110161 A1 | 4/2023 | Nadeau-Dostie et al. | |
| 2023/0185600 A1 | 6/2023 | Wasko et al. | |
| 2023/0189242 A1 | 6/2023 | Aronkytö | |
| 2023/0195161 A1* | 6/2023 | Shiga | H04J 3/0667 |
| | | | 713/400 |
| 2023/0236624 A1 | 7/2023 | Levi et al. | |
| 2023/0251899 A1 | 8/2023 | Levi et al. | |
| 2023/0353635 A1* | 11/2023 | Karumbunathan | |
| | | | H04L 67/1097 |
| 2024/0163000 A1* | 5/2024 | Agarwal | H04W 56/0015 |
| 2024/0223603 A1 | 7/2024 | Lesi et al. | |
| 2024/0224205 A1 | 7/2024 | Machireddy | |
| 2024/0421930 A1 | 12/2024 | Yamagata et al. | |
| 2025/0021130 A1 | 1/2025 | Manevich et al. | |
| 2025/0208647 A1 | 6/2025 | So et al. | |
| 2025/0240110 A1 | 7/2025 | Manevich et al. | |

FOREIGN PATENT DOCUMENTS

| | | | |
|---|---|---|---|
| CN | 108829493 A | 11/2018 | |
| CN | 110581744 A | 12/2019 | |
| CN | 114513293 A | 5/2022 | |
| CN | 114647179 A | 6/2022 | |
| CN | 115189796 A | 10/2022 | |
| EP | 1215559 B1 | 9/2007 | |
| EP | 2770678 A1 | 8/2014 | |
| JP | 2011091676 A | 5/2011 | |
| TW | 498259 B | 8/2002 | |
| WO | 2012007276 A1 | 1/2012 | |
| WO | 2013124782 A2 | 8/2013 | |
| WO | 2013143112 A1 | 10/2013 | |
| WO | 2014029533 A1 | 2/2014 | |
| WO | 2014138936 A1 | 9/2014 | |

OTHER PUBLICATIONS

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia- "Precision Time Protocol", pp. 1-8, Aug. 24, 2019.

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

Weibel, H., "High Precision Clock Synchronization according to IEEE 1588 Implementation and Performance Issues", Zurich University of Applied Sciences, pp. 1-9, Jan. 17, 2005.

Lu et al., "A Fast CRC Update Implementation", Computer Engineering Laboratory, Electrical Engineering Department, pp. 113-120, Oct. 8, 2003.

Texas Instruments, "LMK05318 Ultra-Low Jitter Network Synchronizer Clock With Two Frequency Domains," Product Folder, pp. 1-86, Dec. 2018.

Dlugy-Hegwer et al., "Designing and Testing IEEE 1588 Timing Networks", Symmetricom, pp. 1-10, Jan. 2007.

Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.

ITU-T recommendation, "G.8273.2/Y.1368.2—Timing characteristics of telecom boundary clocks and telecom time slave clocks", pp. 1-50, Jan. 2017.

Levi et al., U.S. Appl. No. 17/868,841, filed Jul. 20, 2022.

Ipclock, "IEEE 1588 Primer," ip-clock.com, pp. 1-3, May 1, 2017 (downloaded from https://web.archive.org/web/20170501192647/http://ip-clock.com/ieee-1588-primer/).

ITU-T Standard G.8261/Y.1361, "Timing and synchronization aspects in packet networks", pp. 1-120, Aug. 2019.

Levi et al., U.S. Appl. No. 17/871,937, filed Jul. 24, 2022.

"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.

ITU-T Standard G.8262/Y.1362, "Timing characteristics of synchronous equipment slave clock", pp. 1-44, Nov. 2018.

ITU-T Standard G.8264/Y.1364, "Distribution of timing information through packet networks", pp. 1-42, Aug. 2017.

Manevich et al., U.S. Appl. No. 17/867,779, filed Jul. 19, 2022.

Ex Parte Quayle Office Action for U.S. Appl. No. 18/448,936, issued Dec. 16, 2024.

Non-Final Office Action U.S. Appl. No. 18/624,169, dated Sep. 5, 2025.

(56) References Cited

OTHER PUBLICATIONS

Zhang et al., "TI BAW technology enables ultra-low jitter clocks for highspeed networks", White paper, Texas Instruments, pp. 1-11, Feb. 2019.

Skywork Solutions Inc., "PCI Express 3.1 JITTER Requirements", AN562, pp. 1-16, year 2021.

Intel, "Can Altera GX/GT/GZ device high speed transceivers handle Spread Spectrum Clocking (SSC), as required py PCle or SATA/SAS protocols?", p. 1, Sep. 11, 2012.

Shapira et al., U.S. Appl. No. 17/534,776, filed Nov. 24, 2021.

Shapira et al., U.S. Appl. No. 17/578,115, filed Jan. 18, 2022.

Kernen et al., U.S. Appl. No. 17/858,236, filed Jul. 6, 2022.

Manevich et al., U.S. Appl. No. 17/885,604, filed Aug. 11, 2022.

Manevich et al., U.S. Appl. No. 18/067,767, filed Dec. 19, 2022.

"IEEE Standard for Local and Metropolitan Area Networks—Timing and Synchronization for Time-Sensitive Applications," IEEE Std 802.1AS-2020, IEEE Computer Society, pp. 1-421, year 2020.

U.S. Appl. No. 17/871,937 Office Action dated Aug. 1, 2023.

U.S. Appl. No. 17/578,115 Office Action dated Apr. 26, 2023.

U.S. Appl. No. 17/534,776 Office Action dated Jun. 29, 2023.

SiTime Corporation, "Sit5377—60 to 220 MHz, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.

PCI-SIG, "PCI Express® —Base Specification—Revision 3.0," pp. 1-860, Nov. 10, 2010.

U.S. Appl. No. 17/191,736 Office Action dated Jun. 26, 2023.

Corbett et al., "Spanner: Google's Globally Distributed Database," ACM Transactions on Computer Systems, vol. 31, No. 3, article 8, pp. 1-22, Aug. 2013.

Wasko et al., U.S. Appl. No. 18/111,916, filed Feb. 21, 2023.

Non-Final Office Action, U.S. Appl. No. 18/418,276, dated Feb. 17, 2026.

Notice of References Cited, U.S. Appl. No. 18/418,276, dated Feb. 17, 2026.

U.S. Non-Final Office Action, U.S. Appl. No. 18/420,822, dated Jan. 7, 2026.

Notice of References Cited, U.S. Appl. No. 18/420,822, dated Jan. 7, 2026.

Non-Final Office Action, U.S. Appl. No. 18/631,095, dated Apr. 9, 2026.

List of References, U.S. Appl. No. 18/631,095, dated Apr. 9, 2026.

* cited by examiner

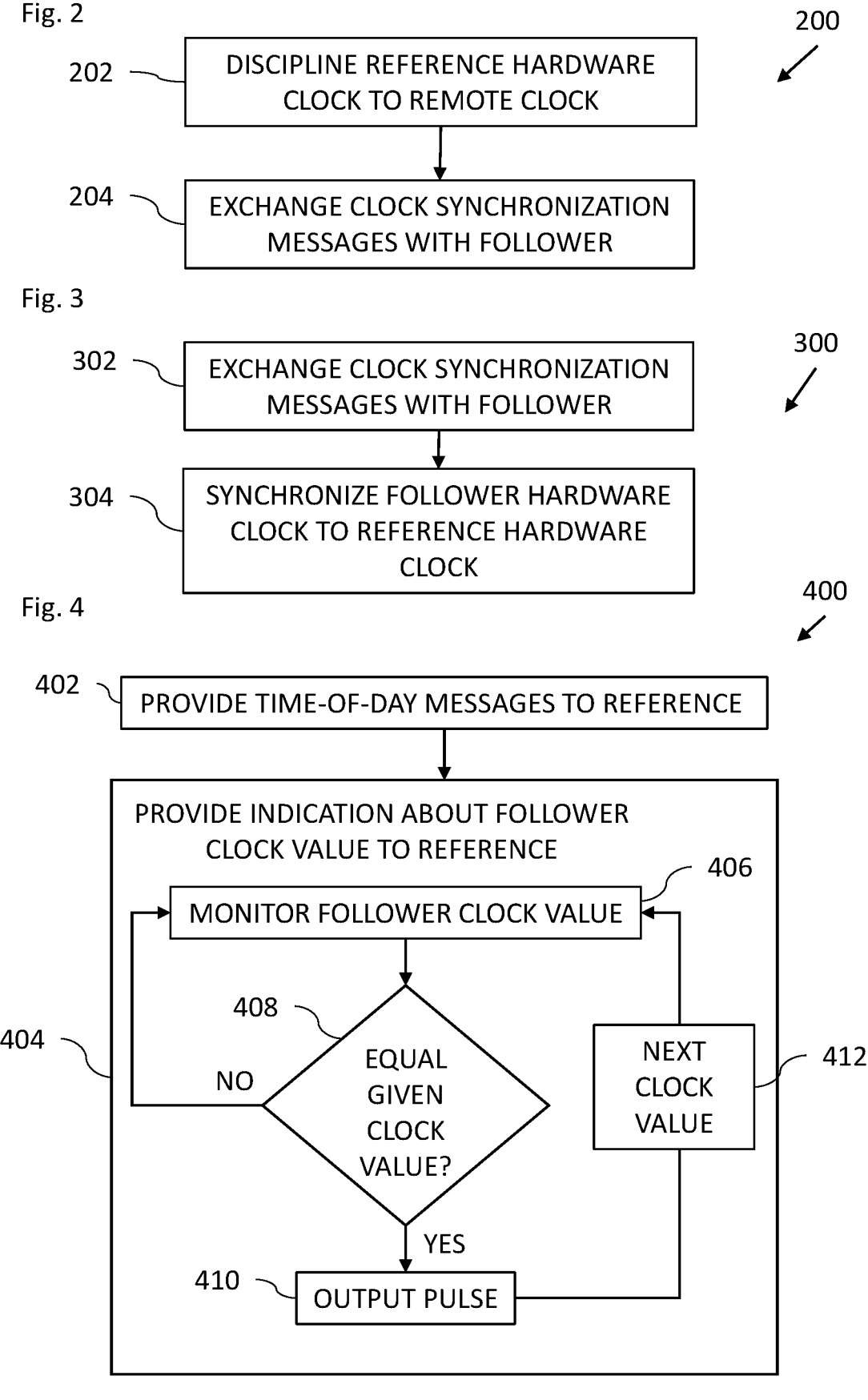

202 — DISCIPLINE REFERENCE HARDWARE CLOCK TO REMOTE CLOCK

204 — EXCHANGE CLOCK SYNCHRONIZATION MESSAGES WITH FOLLOWER

302 — EXCHANGE CLOCK SYNCHRONIZATION MESSAGES WITH FOLLOWER

304 — SYNCHRONIZE FOLLOWER HARDWARE CLOCK TO REFERENCE HARDWARE CLOCK

402 — PROVIDE TIME-OF-DAY MESSAGES TO REFERENCE

PROVIDE INDICATION ABOUT FOLLOWER CLOCK VALUE TO REFERENCE

406 — MONITOR FOLLOWER CLOCK VALUE

404

408 — EQUAL GIVEN CLOCK VALUE?

NO

NEXT CLOCK VALUE — 412

YES

410 — OUTPUT PULSE

500

CLOCK SYNCHRONIZATION MONITORING SYSTEM

FIELD OF THE INVENTION

The present invention relates to computer systems, and in particular, but not exclusively, to time synchronization.

BACKGROUND

A hardware clock in a network device may be disciplined to a remote clock such as a clock over the network or to a Global navigation satellite system (GNSS). Many clock synchronization methods are available to provide accurate clock synchronization. One such method is based on the Precision Time Protocol (PTP), for example.

A hardware clock in a host device connected to the network device may synchronize to the hardware clock in the network device. One method is for the host device to poll the network device several times for the time maintained by the network device and take an average of the received times. This method may introduce errors of at least a few hundred nanoseconds, which in many applications is too large.

Another method for synchronizing the clock of a host device to the clock of a network device is Precision Time Measurement (PTM), a supported feature in the PCI-SIG® PCI Express 3.0 specification, which defines a new protocol of timing measurement and synchronization messages for time-sensitive media and server applications. Examples include industrial automation, instrumentation, geological sciences, telecom synchronization, and synchronized audio/video systems, among others. PTM enables systems that require high precision timing, the ability to monitor and track the time of transactions with sub-microsecond timing accuracy while accelerating server application performance.

SUMMARY

There is provided in accordance with an embodiment of the present disclosure, a system, including a follower processing device including a follower hardware clock to maintain a follower clock value, and follower clock synchronization circuitry to synchronize the follower hardware clock to a remote hardware clock, and provide an indication about the follower hardware clock to a reference processing device, and a reference processing device including a reference hardware clock to maintain a reference clock value, and reference clock synchronization circuitry to monitor a quality of synchronization of the follower hardware clock.

Further in accordance with an embodiment of the present disclosure the reference clock synchronization circuitry is configured to monitor the quality of the synchronization of the follower hardware clock responsively to the provided indication about the follower hardware clock.

Still further in accordance with an embodiment of the present disclosure the follower hardware clock is not synchronized to the reference hardware clock.

Additionally in accordance with an embodiment of the present disclosure the indication is a value of a clock parameter of the follower hardware clock, the clock parameter including one or more of the following a clock time of the follower hardware clock, a clock frequency of the follower hardware clock, a stability of the follower hardware clock, a filtered noise metric of the follower hardware clock, and/or an unfiltered noise metric of the follower hardware clock.

Moreover, in accordance with an embodiment of the present disclosure the reference clock synchronization circuitry is configured to discipline the reference hardware clock responsively to a remote clock.

Further in accordance with an embodiment of the present disclosure the follower clock synchronization circuitry is configured to synchronize the follower hardware clock to the reference hardware clock using a given clock synchronization method, and the reference clock synchronization circuitry is configured to monitor the quality of the synchronization of the follower hardware clock independently of the given clock synchronization method.

Still further in accordance with an embodiment of the present disclosure, the system includes data communication bus connecting the reference processing device and the follower processing device.

Additionally in accordance with an embodiment of the present disclosure the reference clock synchronization circuitry and the follower clock synchronization circuitry are configured to exchange clock synchronization messages in order to synchronize the follower hardware clock to the reference hardware clock.

Moreover in accordance with an embodiment of the present disclosure, the system includes a connector, wherein the reference processing device includes a pulse input unit, the follower clock synchronization circuitry includes a pulse output unit, the connector is configured to connect the pulse output unit to the pulse input unit, and the pulse output unit is configured to output periodic pulses indicative of the follower clock value to the pulse input unit via the connector, responsively to the follower clock value being equal to given clock values.

Further in accordance with an embodiment of the present disclosure the reference clock synchronization circuitry is configured to receive one of the periodic pulses from the pulse input unit and sample the reference clock value responsively to receiving the one periodic pulse.

Still further, in accordance with an embodiment of the present disclosure the reference clock synchronization circuitry is configured to send the sampled reference clock value to the follower processing device or to a management node.

Additionally in accordance with an embodiment of the present disclosure the follower processing device or the management node includes a processor to determine if a clock drift of the follower clock value from the reference clock value exceeds a limit responsively to the sampled reference clock value, and perform an action responsively to the clock drift exceeding the limit.

Moreover, in accordance with an embodiment of the present disclosure the reference clock synchronization circuitry is configured to determine if a clock drift of the follower clock value from the reference clock value exceeds a limit responsively to the sampled reference clock value, and send a request to the follower processing device or to a management node to perform an action responsively to the clock drift exceeding the limit.

Further in accordance with an embodiment of the present disclosure the reference clock synchronization circuitry is configured to determine if a clock drift of the follower clock value from the reference clock value exceeds a limit responsively to the sampled reference clock value, and perform an action responsively to the clock drift exceeding the limit.

Still further in accordance with an embodiment of the present disclosure the reference processing device includes packet processing circuitry, which is configured to block a flow of packets from the follower processing device responsively to the clock drift exceeding the limit.

Additionally in accordance with an embodiment of the present disclosure the follower clock synchronization circuitry is configured to provide time-of-day (TOD) messages to the reference clock synchronization circuitry, which is configured to determine if a clock drift of the follower clock value from the reference clock value exceeds a limit responsively to the sampled reference clock value and at least one of the time-of-day messages.

Moreover, in accordance with an embodiment of the present disclosure the follower clock synchronization circuitry is configured to provide the time-of-day messages at a frequency greater than two times a frequency of the periodic pulses.

Further in accordance with an embodiment of the present disclosure the follower clock synchronization circuitry is configured to provide the time-of-day messages periodically.

Still further in accordance with an embodiment of the present disclosure the reference clock synchronization circuitry is configured to receive the indication from the follower processing device and sample the reference clock value responsively to receiving the indication.

Additionally in accordance with an embodiment of the present disclosure the reference clock synchronization circuitry is configured to send the sampled reference clock value to the follower processing device or to a management node.

Moreover, in accordance with an embodiment of the present disclosure the follower processing device or the management node includes a processor to determine if a clock drift of the follower clock value from the reference clock value exceeds a limit responsively to the sampled reference clock value, and perform an action responsively to the clock drift exceeding the limit.

Further in accordance with an embodiment of the present disclosure the reference clock synchronization circuitry is configured to determine if a clock drift of the follower clock value from the reference clock value exceeds a limit responsively to the sampled reference clock value, and send a request to the follower processing device or to a management node to perform an action responsively to the clock drift exceeding the limit.

Still further in accordance with an embodiment of the present disclosure the reference clock synchronization circuitry is configured to determine if a clock drift of the follower clock value from the reference clock value exceeds a limit responsively to the sampled reference clock value, and perform an action responsively to the clock drift exceeding the limit.

Additionally in accordance with an embodiment of the present disclosure the follower processing device includes a central processing unit (CPU) or a graphics processing unit (GPU).

Moreover, in accordance with an embodiment of the present disclosure the follower processing device and the reference processing device are included in a network switch including packet processing circuitry and a central processing unit (CPU).

Further in accordance with an embodiment of the present disclosure the reference processing device includes any one or more of the following a network device to be connected to a network and connect to the remote clock over the network, a network interface controller to be connected to the network and connect to the remote clock over the network, a network switch to connect to the remote clock over the network, and a timecard to be connected to a satellite time source, which is the remote clock.

There is also provided in accordance with another embodiment of the present disclosure, a system, including a peripheral device including a reference hardware clock to maintain a reference clock value, and reference clock synchronization circuitry, and multiple host devices, each host device including a follower hardware clock to maintain a follower clock value, and follower clock synchronization circuitry to synchronize the follower hardware clock of a respective one of the host devices to a remote hardware clock, and provide an indication about the follower clock value of the respective host device to the reference processing device, wherein the reference clock synchronization circuitry is configured to monitor a quality of synchronization of the follower hardware clock of each host device responsively to the provided indication about the follower clock value of the respective host device.

Still further in accordance with an embodiment of the present disclosure, the system includes connectors, wherein the peripheral device includes a pulse input unit, the follower clock synchronization circuitry of each host device includes a pulse output unit, a respective one of the connectors is configured to connect the pulse output unit of each host device to the pulse input unit, and the pulse output unit of each host device is configured to output periodic pulses indicative of the follower clock value of the respective host device to the pulse input unit via the respective connector, responsively to the follower clock value of the respective host device being equal to given clock values.

Additionally in accordance with an embodiment of the present disclosure the pulse output unit of each host device is configured to time the output of the periodic pulses in a round-robin manner with respect to other ones of the host devices.

Moreover, in accordance with an embodiment of the present disclosure, the system includes a pulse input-output switch to receive the periodic pulses output by the pulse output unit of each host device and output the received periodic pulses to the pulse input unit.

Further in accordance with an embodiment of the present disclosure the pulse-input-output switch is configured to select from the periodic pulses output by the hosts devices in a round-robin manner for output to the pulse input unit.

Still further in accordance with an embodiment of the present disclosure the pulse-input-output switch is disposed on a mother board of the host devices, or disposed on a mother board of the peripheral device, or a standalone device disposed between the host devices and the peripheral device.

Additionally in accordance with an embodiment of the present disclosure, the system includes connectors, wherein the peripheral device includes multiple pulse input units, the follower clock synchronization circuitry of each host device includes a pulse output unit, a respective one of the connectors is configured to connect the pulse output unit of each host device to a respective one of the pulse input units, and the pulse output unit of each host device is configured to output periodic pulses indicative of the follower clock value of the respective host device to the respective pulse input unit via the respective connector, responsively to the follower clock value of the respective host device being equal to given clock values.

There is also provided in accordance with still another embodiment of the present disclosure, a method, including maintaining a reference clock value, maintaining a follower clock value, synchronizing a follower hardware clock to a remote hardware clock, providing an indication about the follower hardware clock to a reference processing device, and monitoring a quality of synchronization of the follower hardware clock.

There is also provided in accordance with still another embodiment of the present disclosure, a clock parameter monitoring system, including an interface to receive indications of values of a clock parameter from processing devices, a processor to compare the received indications of the values of the clock parameter, and detect an anomaly in a hardware clock of one of the processing devices responsively to comparing the received indications of the values of the clock parameter.

There is also provided in accordance with still another embodiment of the present disclosure, a clock parameter monitoring method, including receiving indications of values of a clock parameter from processing devices, comparing the received indications of the values of the clock parameter, and detecting an anomaly in a hardware clock of one of the processing devices responsively to comparing the received indications of the values of the clock parameter.

BRIEF DESCRIPTION OF THE DRAWINGS

The present invention will be understood from the following detailed description, taken in conjunction with the drawings in which:

FIG. 2 is a flowchart including steps in a method of clock synchronization performed by a reference processing device of the system of FIG. 1;

FIG. 3 is a flowchart including steps in a method of clock synchronization by a follower processing device of the system of FIG. 1;

FIG. 4 is a flowchart including steps in a method of providing time indications by a follower processing device of the system of FIG. 1;

DESCRIPTION OF EXAMPLE EMBODIMENTS

Overview

Figure 1:
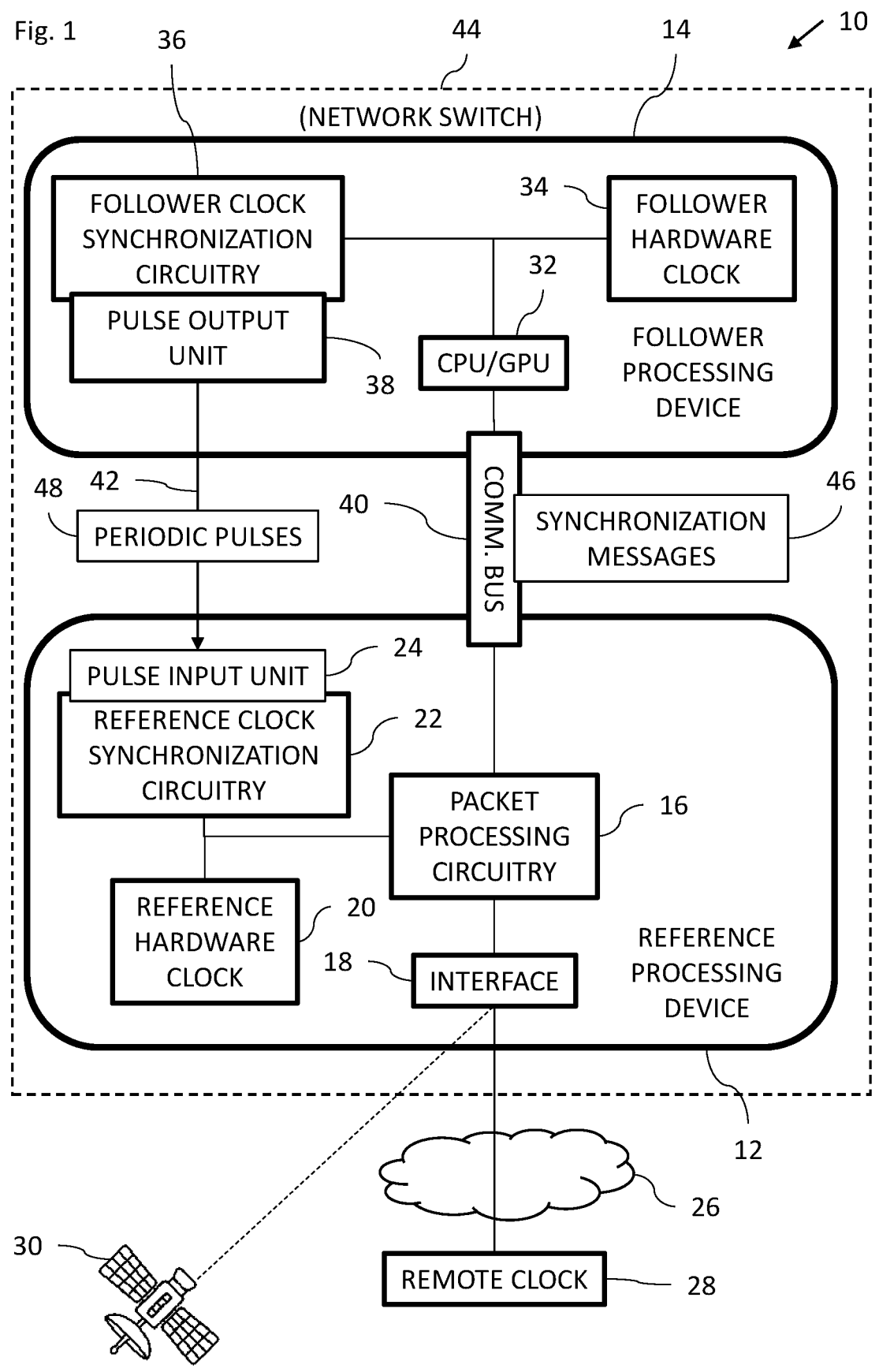
FIG. 1 is a block diagram view of a clock synchronization and monitoring system constructed and operative in accordance with an embodiment of the present invention.

Certain systems require high precision timing. In such systems, it is important for the hardware clock of the processing device to be accurately synchronized. For example, when a host hardware clock is synchronized to the hardware clock of a connected network device, synchronization software running on the host device may malfunction leading to a clock drift (from the network device clock) greater than an acceptable limit. Without additional information, the host device and/or network device may assume the worst-case scenario, and assume that the clock drift of the host hardware clock is too large, and act on the assumption that the host clock is not synchronized enough to perform certain time critical tasks (e.g., database updates).

Embodiments of the present invention address some of the above drawbacks by a reference processing device that monitors clock synchronization quality of the follower processing device. The reference device may or may not provide a reference clock to the follower processing device. Clock synchronization quality may provide a measure (e.g., measured in nanoseconds) of clock drift (and other synchronization quality metrics) between the time maintained by a hardware clock of the reference processing device and the time maintained by a hardware clock of the follower processing device. Monitoring the synchronization of the follower hardware clock from the reference processing device checks that the follower hardware clock is synchronized accurately enough, and remains synchronized, and if not, an appropriate action may be taken by the reference processing device, or by the follower processing device, or by a management node. The term "monitor a quality of the synchronization", in all grammatical forms, as used in the specification and claims, may include checking that the clock(s) running on the follower processing device(s) are within given limits defined quantitively by one or more clock metrics such as clock drift, clock stability, a filtered and/or unfiltered noise metric. The monitoring may include receiving an indication about a clock parameter of the follower processing device (or indications of clock parameters from multiple follower processing devices), and based on the indication(s), may also include computing the quality of synchronization, comparing the received indications from different follower devices to identify an anomaly, and/or initiating an action for the reference processing device(s) or sending data to another device (e.g., management node or the follower processing device(s) e.g., to initiate an action for the reference processing device(s) or to perform anomaly detection by the other device. It should be noted that the clock(s) of the follower processing device(s) may be synchronized to the clock of the reference processing device using a given clock synchronization method. Therefore, even if the clock synchronization method fails (e.g., due to a software crash) the reference processing device may still be able to monitor the quality of the synchronization of the follower processing device(s) using the monitoring. In some embodiments, the clock(s) of the follower processing device(s) may be synchronized to another device, and not to the clock of the reference processing device. Whether or not the clock(s) of the follower processing device(s) are synchronized to the clock of the reference processing device using a given clock synchronization method, the term "monitoring" includes performing clock synchronization quality monitoring independently of the given clock synchronization method used by the follower processing device(s) to discipline the clock(s) of the follower processing device(s) such that the monitoring method includes steps that are different to the steps of the given clock synchronization method.

The hardware clock of the reference processing device may be disciplined to a remote clock, such as a remote PTP clock or any remote clock over a network, or a time supplied by a Global navigation satellite system (GNSS). The follower hardware clock may be synchronized to the reference hardware clock using any suitable method, for example, by exchanging clock synchronization messages using a suitable clock synchronization method, such as Precision Time Measurement (PTM). The synchronization of the follower hardware clock to the reference hardware clock is generally performed via an interface between the two processing devices such as a data communication bus, operating according to any suitable protocol, e.g., Peripheral Component Interconnect Express (PCIe).

The reference processing device may monitor the quality of the synchronization follower hardware clock based on the follower processing device providing an indication about the follower clock value to the reference processing device, without needing to rely on clock synchronization software (which may fail) running on the follower processing device to perform the monitoring. In some embodiments, the follower processing device provides a software-independent method of receiving its clock value, such as Precision Time Measurement (PTM). In some embodiments, the follower processing device outputs periodic pulses indicative of the follower clock value to the reference processing device. For example, every second when the nanosecond value is equal to zero, (or any other suitable timing) according to the follower clock value, the follower processing device outputs a pulse to the reference processing device. In some embodiments, a hardware element in the follower processing device monitors the follower clock value and detects a wraparound of the nanosecond field of the follower clock value (i.e., when the nanosecond field passes, or is equal to, zero) and then generates a pulse output in response to detecting the wraparound. The reference processing device may then deduce from the timing of the received pulse(s) whether the follower hardware clock is sufficiently synchronized with the reference hardware clock. The periodic pulses may be sent from the follower processing device to the reference processing device from a pulse output unit (e.g., pulse per second (PPS) output) of the follower processing device to a pulse input unit (e.g., PPS input) of the reference processing device via a suitable connection (e.g., circuit board trace or clock cable).

In some embodiments, when the reference processing device receives a pulse from the follower processing device, the reference processing device retrieves the reference clock value from the reference hardware clock. In some embodiments, the reference processing device computes a clock drift between the follower clock and the reference clock based on the retrieved reference clock value. For example, if the follower processing device sends a periodic pulse at 08:00:00 according to the follower clock value and the pulse is received in the reference processing device at 08:00:00 plus 28 nanoseconds according to the reference clock value (which was retrieved by the reference processing device upon receipt of the pulse), and the delay in the connection between the follower processing device and the reference processing device is 20 nanoseconds, then the synchronization error (or clock drift) between the follower clock and the reference clock is-8 nanoseconds.

In some embodiments, the reference processing device may perform a suitable action and/or request the follower processing device to perform a suitable action based on the computed clock drift exceeding a given limit (e.g., blocking certain traffic).

In some embodiments, the reference processing device may send the computed clock drift to the follower processing device. The follower processing device may then perform a suitable action (e.g., block certain traffic or block an application from running) based on the computed clock drift exceeding a given limit.

In some embodiments, the reference processing device sends the retrieved reference clock value to the follower processing device for the follower processing device to compute the clock drift and perform a suitable action (e.g., block certain traffic or block an application from running) if necessary.

The follower processing device may send time-of-day (TOD) messages to the reference processing device intermittently, e.g., at twice the frequency or more that the periodic pulses are sent to the reference processing device so that the clock drift may be computed correctly in case the clock drift is close to or larger than half of the period of the periodic pulses. For example, if the follower clock generates a pulse at 08:00:01 (according to the follower clock) and the reference clock receives this pulse at time of 08:00:00 plus 28 nanoseconds), and the delay in the connection between the follower processing device and the reference processing device is 20 nanoseconds, without additional information, the synchronization error (or clock drift) will be calculated as −8 nanoseconds whereas in reality the time error is +999'999'992 nanoseconds (with follower clock leading the reference clock by almost a full second). Using the follower clock value included in the TOD message, the reference clock circuitry is able to disambiguate the periodic pulse (i.e., to determine which second the periodic pulse corresponds to).

In some embodiments, the follower processing device may be a host device (e.g., including a central processing unit (CPU) and/or graphics processing unit (GPU)). In some embodiments, the reference processing device may be a network device, a network switch, a network interface controller, or a timecard (e.g., including a Field Programmable Gate Array (FPGA) and GNSS receiver to receive time from a GNSS), by way of example. In some embodiments, the reference processing device and the follower processing device may be comprised in a network switch with the reference processing device including a network interface and forwarding circuitry, and the follower processing device including a processor or processors such as a CPU and/or GPU.

In some embodiments, multiple follower processing devices (e.g., multiple host devices) connected to a reference processing device (e.g., peripheral device) may be monitored by the reference processing device to monitor a quality of synchronization of each of the follower device clocks (e.g., of each of the host devices) to the reference processing device clock. In some embodiments, each of the follower processing devices may include a pulse output unit to output periodic pulses to the pulse input unit of the reference processing device in a similar manner as described above.

A pulse input-output switch (e.g., PPS switch) may be used to provide a connection between the pulse output units of each of the follower processing devices to the pulse input unit of the reference processing device. The pulse input-output switch may be installed on a motherboard of the multiple follower processing devices or on a motherboard of the reference processing device. In some embodiments, the pulse input-output switch may be a standalone device installed between the follower processing devices and the reference processing device.

In some embodiments, the periodic pulses output by the follower processing devices may be timed, e.g., in a round-robin manner, so that the reference processing device may identify which pulse is sent by which follower processing device. For example, follower processing device A outputs a pulse when its clock time is equal to 08:00:00, follower processing device B outputs a pulse when its clock time is equal to 08:00:01, follower processing device C outputs a pulse when its clock time is equal to 08:00:02, and so on.

In some embodiments, the pulse input-output switch may select which pulses received from the follower processing device are allowed to pass to the pulse input unit of the reference processing device according to some timing method, e.g., in round-robin manner. In this manner the follower processing devices do not need to time their outputs in a round-robin manner, etc.

In some embodiments, the reference processing device may include multiple pulse input units so that the pulse output unit of each follower processing device may be connected to a corresponding one of the pulse input units. In other words, each pulse input unit is connected to one of the pulse output units. In this manner, the reference processing device identifies the source of a periodic pulse based on the pulse input unit receiving the pulse and therefore a timing mechanism, e.g., round robin, does not need to be implemented among the follower processing devices.

System Description

Reference is now made to FIG. 1, which is a block diagram view of a clock synchronization and monitoring system 10 constructed and operative in accordance with an embodiment of the present invention. System 10 includes a reference processing device 12 and a follower processing device 14.

Reference processing device 12 includes packet processing circuitry 16, an interface 18 (e.g., a network interface), a reference hardware clock 20, reference clock synchronization circuitry 22, and a pulse input unit 24 (e.g., a pulse per second (PPS) input unit), which may be comprised in the reference clock synchronization circuitry 22. Packet processing circuitry 16 is configured to process packets received over a network 26, and process packets for sending over the network 26. Packet processing circuitry 16 may include a physical layer (PHY) unit, and a MAC unit (not shown), among other processing components. In some embodiments, the reference processing device 12 does not include packet processing circuitry 16. Interface 18 is configured to provide a connection to network 26, for example, to exchange clock synchronization messages with a remote clock 28. In some embodiments, the interface 18 is configured to receive time data from a satellite time source 30, such as a GNSS. The reference hardware clock 20 is configured to maintain a reference clock value.

Reference clock synchronization circuitry 22 and pulse input unit 24 are described in more detail with reference to FIGS. 2 and 5. In practice, some or all of the functions of the reference clock synchronization circuitry 22 may be combined in a single physical component or, alternatively, implemented using multiple physical components. These physical components may comprise hard-wired or programmable devices, or a combination of the two. In some embodiments, at least some of the functions of the reference clock synchronization circuitry 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The follower processing device 14 includes a processor 32 (e.g., a central processing unit (CPU) or a graphics processing unit (GPU), a follower hardware clock 34, follower clock synchronization circuitry 36, and a pulse out unit 38 (e.g., a PPS output unit), which may be comprised in the follower clock synchronization circuitry 36. The follower hardware clock 34 is configured to maintain a follower clock value.

The follower clock synchronization circuitry 36 and pulse out unit 38 are described in more detail with reference to FIGS. 3, 4, and 6. In practice, some or all of the functions of the follower clock synchronization circuitry 36 may be combined in a single physical component or, alternatively, implemented using multiple physical components. These physical components may comprise hard-wired or programmable devices, or a combination of the two. In some embodiments, at least some of the functions of the follower clock synchronization circuitry 36 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

System 10 includes a data communication bus 40 connecting the reference processing device 12 and the follower processing device 14. The data communication bus 40 may be implemented using any suitable protocol, for example, Peripheral Component Interconnect Express (PCIe). The data communication bus 40 is configured to carry data between the reference processing device 12 and the follower processing device 14, including clock synchronization messages 46. System 10 includes a connector 42 (e.g., a printed circuit board (PCB) trace or a cable) configured to connect the pulse out unit 38 to the pulse input unit 24. The connector 42 is configured to carry periodic pulses 48 from the pulse out unit 38 to the pulse input unit 24.

In some embodiments, reference processing device 12 and follower processing device 14 are comprised in a network switch 44 comprising the packet processing circuitry 16 and processor 32.

In some embodiments, reference processing device 12 may include any one or more of the following: a peripheral device, a network device to be connected to the network 26 and connect to the remote clock 28 over the network 26; a network interface controller to be connected to the network 26 and connect to the remote clock 26 over the network 26; the network switch 44 to connect to the remote clock 28 over the network 26; and/or a timecard to be connected to satellite time source 30, which is a remote clock.

Reference is now made to FIG. 2, which is a flowchart 200 including steps in a method of clock synchronization performed by reference processing device 12 of the system 10 of FIG. 1. Reference is also made to FIG. 1. The reference clock synchronization circuitry 22 is configured to discipline the reference hardware clock 20 responsively to remote clock 28, which is remote to the system 10 (block 202). In some embodiments, the reference clock synchronization circuitry 22 is configured to exchange clock synchronization messages (e.g., in accordance with a clock synchronization protocol, such as PTP) with the remote clock 28 in order to discipline the reference hardware clock 20. In some embodiments, the reference clock synchronization circuitry 22 receives a remote clock from the satellite time source 30 in order to discipline the reference hardware clock 20. In some embodiments, the reference hardware clock 20 is disciplined intermittently according to the remote clock 28 and/or the satellite time source 30.

In some embodiments, the reference clock synchronization circuitry 22 is configured to exchange clock synchronization messages 46 with the follower clock synchronization circuitry 36 over data communication bus 40 in order to synchronize the follower hardware clock 34 to the reference hardware clock 20 (block 204), for example, using a suitable clock synchronization protocol such as PTM.

In some embodiments, the reference processing device 12 does not synchronize the reference hardware clock 20 with an external device. For example, reference hardware clock 20 may be a grand master clock, or an independently running clock.

Reference is now made to FIG. 3, which is a flowchart 300 including steps in a method of clock synchronization by follower processing device 14 of the system 10 of FIG. 1. Reference is also made to FIG. 1. The follower clock synchronization circuitry 36 is configured to synchronize the follower hardware clock 34 to the reference hardware clock 20 (block 304). In some embodiments, the follower clock synchronization circuitry 36 (e.g., software running on the follower clock synchronization circuitry 36) is configured to exchange clock synchronization messages 46 with reference clock synchronization circuitry 22 (block 302) in order to synchronize the follower hardware clock 34 to the reference hardware clock 20 (block 304) using any suitable clock synchronization protocol, such as PTM. In some embodiments, the follower hardware clock 34 is synchronized intermittently to the reference hardware clock 20.

In some embodiments, the follower processing device 14 may not synchronize the follower hardware clock 34 to the reference hardware clock 20. In some embodiments, the follower processing device 14 may be configured to synchronize the follower hardware clock 34 to any suitable remote clock.

Reference is now made to FIG. 4, which is a flowchart 400 including steps in a method of providing time indications by the follower processing device 14 of the system 10 of FIG. 1. Reference is also made to FIG. 1. In some embodiments, the follower clock synchronization circuitry 36 is configured to provide time-of-day (TOD) messages intermittently (e.g., periodically) to the reference clock synchronization circuitry 22 via the data communication bus 40 (block 402). In some embodiments, the follower clock synchronization circuitry 22 is configured to provide the time-of-day messages at a frequency greater than two times the frequency of the periodic pulses 48, as described in more detail with reference to FIG. 5.

The reference processing device 12 may monitor the quality of the follower hardware clock 34 based on the follower processing device 14 providing an indication about the follower hardware clock (e.g., the follower clock value) to the reference processing device 12, without needing to rely on clock synchronization software (which may fail) running on the follower processing device 14 to perform the monitoring. Therefore, the follower clock synchronization circuitry 36 is configured to provide an indication about the follower clock value to the reference processing device 12 (block 404).

The pulse out unit 38 is configured to output periodic pulses 48 indicative of (a phase of) the follower clock value to the pulse input unit 24 via the connector 42, responsively to the follower clock value being equal to given clock values. For example, the pulse out unit 38 outputs the periodic pulses 48 every second when the nanosecond value is equal to zero, (or any other suitable timing) according to the follower clock value. In some embodiments, a hardware element, e.g., of reference clock synchronization circuitry 22, may be configured to monitor the follower clock value (block 406) and determine at a decision block 408 if the (phase of the) follower clock value is equal to a given clock value (e.g., phase). If the follower clock value is not equal to the given clock value, the step of block 406 is repeated. If the follower clock value is equal to the given clock value, the hardware element is configured to generate a pulse and the pulse out unit 38 is configured to output the generated pulse via the connector 42 to the pulse input unit 24 (block 410). The step of block 406 is then repeated based on the next clock value (e.g., the next round second) (block 412) of the follower clock value to be monitored.

For example, the hardware element may be configured to detect a wraparound of the nanosecond field of the follower clock value (i.e., when the nanosecond field passes, or is equal to, zero) and then generate a pulse output in response to detecting the wraparound. The reference processing device 12 may then deduce from the timing of the received pulse(s) whether the follower hardware clock 34 is sufficiently synchronized with the reference hardware clock 20.

In some embodiments, instead of sending periodic pulses 48 to the reference processing device 12, the follower clock synchronization circuitry 36 is configured to send any suitable indication about the follower clock value (e.g., a time-of-day message) to the reference processing device 12. In some embodiments, the reference processing device 12 may send an indication about the follower clock value when a clock parameter exceeds a given threshold. Examples of threshold values may include: a specified time duration (minimum or maximum) between events (e.g., between receiving a predetermined or configurable number of symbols); and/or a minimum or maximum number of symbols that are unmasked by a given filter in a configurable time period.

In some embodiments, the follower clock synchronization circuitry 36 is configured to send an indication about a value (or values) of one or more clock parameters of the follower hardware clock 34 to the reference processing device 12. The clock parameters may include any one or more of the following: a clock time of the follower hardware clock 34, a clock frequency of the follower hardware clock 34, a stability of the follower hardware clock 34, a filtered noise metric of the follower hardware clock 34, and/or an unfiltered noise metric of the follower hardware clock 34.

Figure 5:
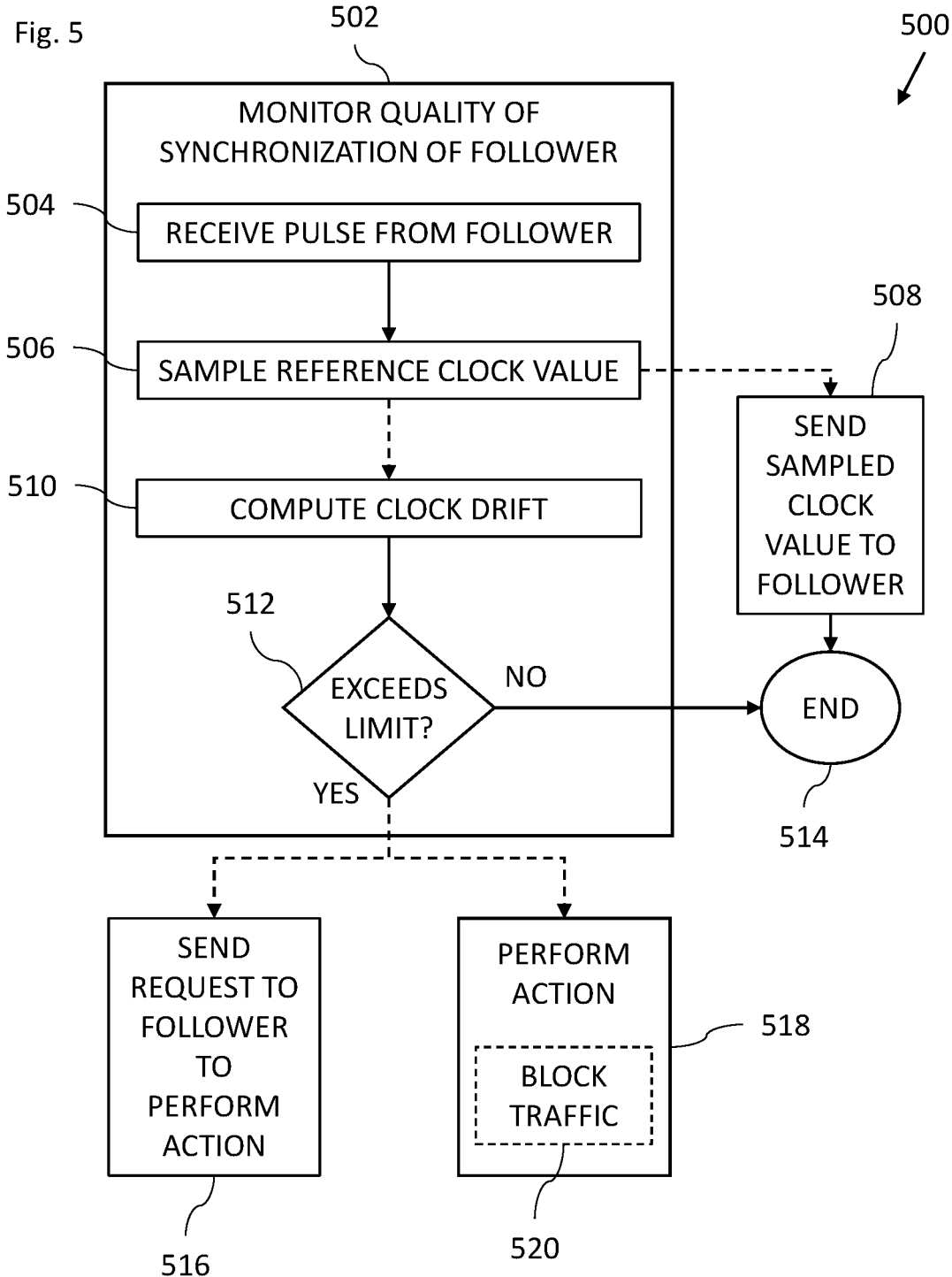
FIG. 5 is a flowchart including steps in a method of monitoring a quality of the synchronization of the follower by a reference processing device of the system of FIG. 1.

Reference is now made to FIG. 5, which is a flowchart 500 including steps in a method of monitoring a quality of the synchronization of the follower hardware clock 34 by the reference processing device 12 of the system 10 of FIG. 1. Reference is also made to FIG. 1. The reference clock synchronization circuitry 22 is configured to monitor a quality of the synchronization of the follower hardware clock 34 to the reference hardware clock 20 responsively to the provided indication (e.g., one of the periodic pulses 48) about the follower clock value from the follower processing device 14 (block 502).

The reference clock synchronization circuitry 22 is configured to receive one of the periodic pulses 48 from the pulse input unit 24 (block 504) and sample the reference clock value (from the reference hardware clock 20) responsively to receiving the periodic pulse 48 (block 506).

In some embodiments, the reference clock synchronization circuitry 22 is configured to send the sampled reference clock value to the follower processing device 14 or to a management node for analysis and taking any suitable action (block 508), for example, de-scheduling tasks from the follower processing device 14.

In some embodiments, the reference clock synchronization circuitry 22 is configured to compute a clock drift (e.g., measured in seconds) of the follower clock value from the reference clock value responsively to (i.e., based on) the sampled clock value (block 510). For example, if the follower processing device 14 sends a periodic pulse at 08:00:00 according to the follower clock value and the pulse 48 is received in the reference processing device at 08:00:00 plus 28 nanoseconds according to the reference clock value (which was sampled by the reference clock synchronization circuitry 22 upon receipt of the pulse 48), and the delay in the connection between the follower processing device and the reference processing device is 20 nanoseconds, then the synchronization error (or clock drift) between the follower clock and the reference clock is-8 nanoseconds.

In some embodiments, the reference clock synchronization circuitry 22 is configured to compute the clock drift of the follower clock value from the reference clock value responsively to (i.e., based on) the sampled clock value and at least one of the received time-of-day messages. The follower processing device 14 may send time-of-day (TOD) messages to the reference processing device 12 intermittently, e.g., at twice the frequency or more that the periodic pulses 48 are sent to the reference processing device 12 so that the clock drift may be computed correctly in case the clock drift is close to or larger than half of the period of the periodic pulses. For example, if the follower clock generates a pulse at 08:00:01 (according to the follower clock) and the reference clock receives this pulse at time of 08:00:00 plus 28 nanoseconds), and the delay in the connection between the follower processing device and the reference processing device is 20 nanoseconds, without additional information, the synchronization error (or clock drift) will be calculated as −8 nanoseconds whereas in reality the time error is +999'999'992 nanoseconds (with follower clock leading the reference clock by almost a full second). Using the follower clock value included in the TOD message, the reference clock circuitry is able to disambiguate the periodic pulse (i.e., to determine which second the periodic pulse corresponds to). The reference clock synchronization circuitry 22 is configured to determine if the clock drift of the follower clock value from the reference clock value exceeds a limit (block 512) (responsively to, i.e., based on, the sampled reference clock value, the limit, and optionally one or more of the TOD messages). If the clock drift does not exceed the limit, the method ends (block 514). If the clock drift does exceed the limit, the reference clock synchronization circuitry 22 may be configured to perform any one or more of the following: send a request to the follower processing device 14 or to the management node to perform an action (block 516); and/or perform an action (block 518), such as block a flow of packets from the follower processing device 14 (block 520). The management node may be a node connected to reference processing device 12 or follower processing device 14 via a network, or via a data communication bus for example.

In some embodiments, instead of receiving periodic pulses 48 from the follower processing device 14, the reference processing device 12 is configured to receive any suitable indication about the follower clock value (e.g., a time-of-day message) (or an indication about one or more clock parameters e.g., periodically and/or when the clock parameter(s) exceed a given threshold or thresholds, previously described) from the follower processing device 14. The indication may be sent by the follower processing device 14 intermittently (e.g., every second on the second) or upon request of the reference processing device 12. In some embodiments, upon receipt of the indication, the reference clock synchronization circuitry 22 may be configured to retrieve the reference clock value from the reference hardware clock 20 and timestamp the received indication with the time of the retrieved from the reference hardware clock 20. The reference clock synchronization circuitry 22 may be configured to: (a) send the received indication and retrieved timestamp to follower processing device 14 or the management node; or (b) compute the clock drift based on the received indication and timestamp, and (i) perform an action if the clock drift exceeds a given limit, and/or (ii) send a request to follower processing device 14 or to the management node to perform an action, such as de-scheduling tasks from the follower processing device 14.

Figure 6:
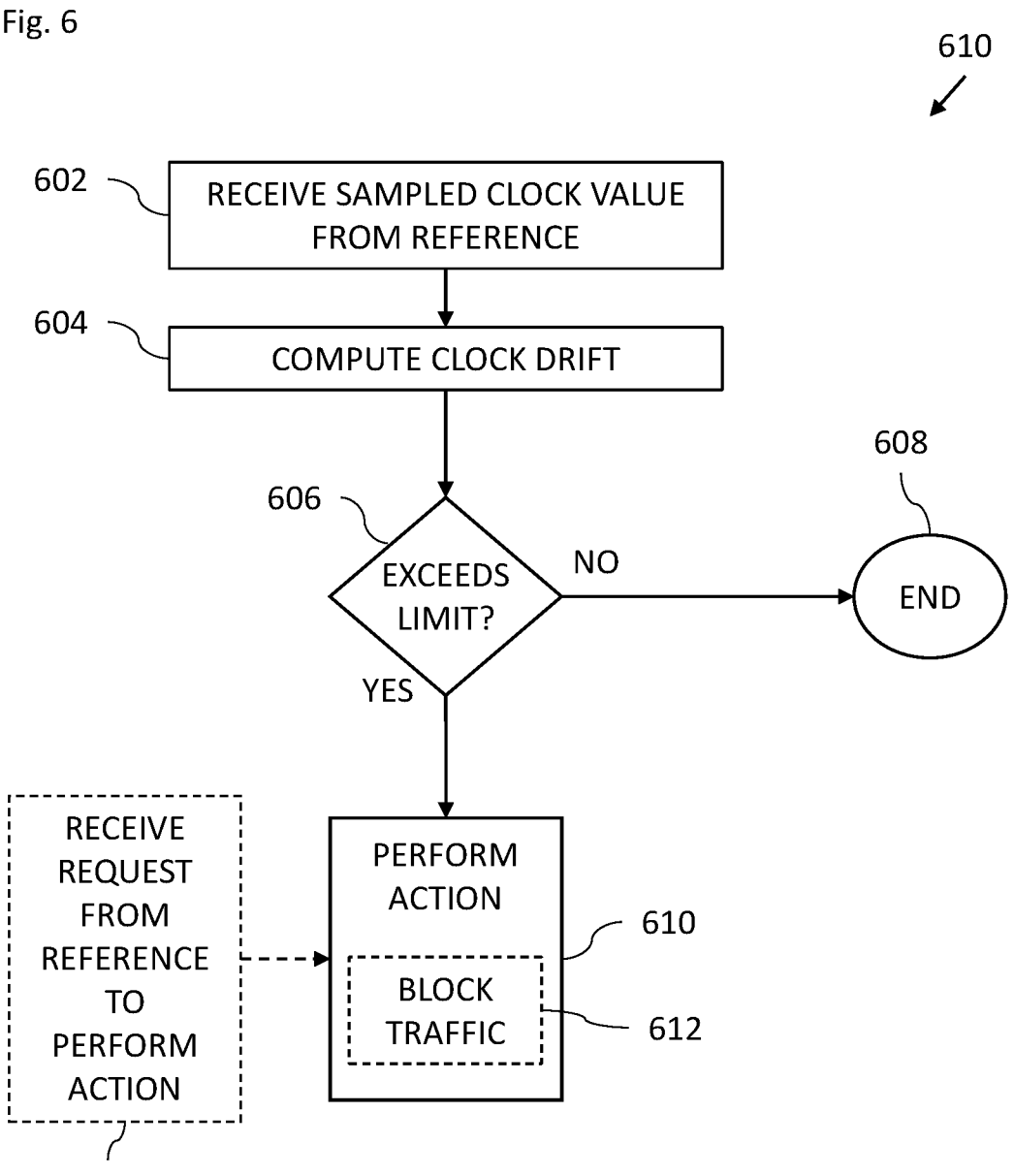
FIG. 6 is a flowchart including steps in a method of acting on the method of quality monitoring of FIG. 5.

Reference is now made to FIG. 6, which is a flowchart 600 including steps in a method of acting on the method of quality monitoring of FIG. 5. Reference is also made to FIG. 1. In some embodiments, the processor 32 of the follower processing device 14 is configured to receive the sampled clock value from the reference clock synchronization circuitry 22 (block 602). The processor 32 is configured to compute the clock drift of the follower clock value from the reference clock value responsively to (i.e., based on) the sampled clock value (block 604). The processor 32 is configured to determine if the clock drift exceeds a limit (block 606) (responsively to, i.e., based on, the sampled reference clock value and the limit). If the clock drift does not exceed the limit, the method ends (block 608). If the clock drift does exceed the limit, the processor 32 may be configured to perform an action (block 610), such as block a flow traffic (block 612) or block or prevent an application from running. In some embodiments, the steps of blocks 602 and 604 may be replaced by the processor 32 or the management node receiving the computed clock drift from the reference processing device 12.

In some embodiments, the processor 32 (or the management node) is configured to: receive a request from the reference clock synchronization circuitry 22 to perform an action (block 614); and perform the requested action (block 610).

Figure 7:
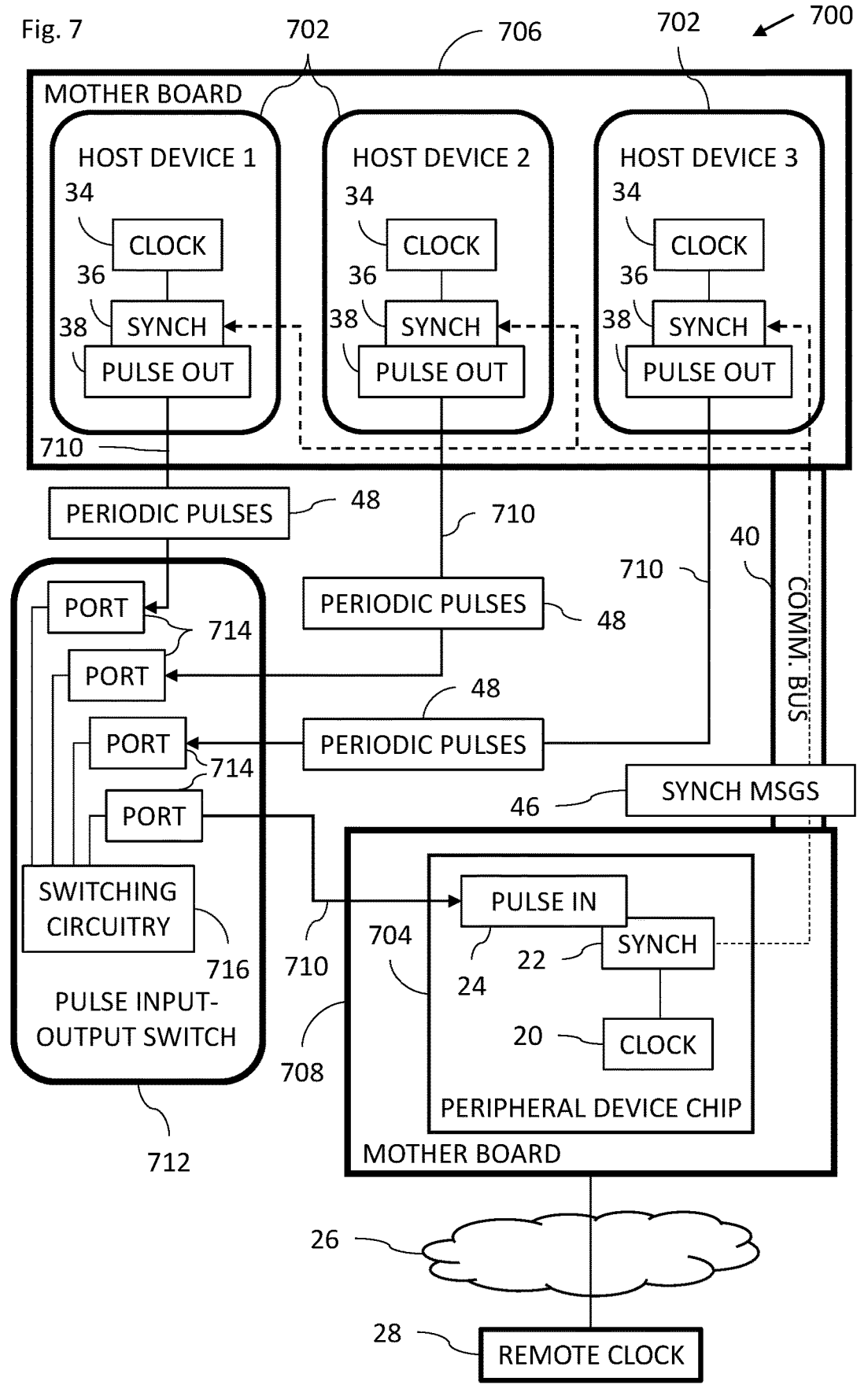
FIG. 7 is a block diagram view of a first multi-host clock synchronization and monitoring system constructed and operative in accordance with an embodiment of the present invention.

Reference is now made to FIG. 7, which is a block diagram view of a first multi-host clock synchronization and monitoring system 700 constructed and operative in accordance with an embodiment of the present invention.

System 700 includes multiple host devices 702 and a peripheral device 704, and data communication bus 40 connecting the host devices 702 to the peripheral device 704. The host devices 702 may be implemented on a motherboard 706, while the peripheral device 704 may be implemented on a motherboard 708. Each host device 702 is substantially the same as the follower processing device 14 of FIG. 1 and the peripheral device 704 is substantially the same as the reference processing device 12 of FIG. 1.

The peripheral device 704 includes reference hardware clock 20 configured to maintain a reference clock value and reference clock synchronization circuitry 22 to discipline the reference hardware clock 20 responsively to remote clock 28, which is remote to the system 700.

Each host device 702 includes follower hardware clock 34 configured to maintain a follower clock value and follower clock synchronization circuitry 36 configured to: synchronize its follower hardware clock 34 to the reference hardware clock 20 (e.g., using clock synchronization messages 46); and provide an indication (e.g., pulse 48) about the follower clock value of its follower hardware clock 34 to the peripheral device 704. The reference clock synchronization circuitry 22 is configured to monitor a quality of the synchronization of the follower hardware clock 34 of each host device 702 to the reference hardware clock 20 responsively to the provided indication (from each host device 702) about the follower clock value of the respective host device 702.

The system includes connectors 710 (e.g., circuit board traces and/or cables). The peripheral device 704 includes pulse input unit 24 (e.g., comprised in the reference clock synchronization circuitry 22). Each host device 702 includes the pulse out unit 38 (e.g., comprised in the follower clock synchronization circuitry 36). A respective one of the connectors 710 is configured to connect the pulse output unit 38 of each host device 702 to the pulse input unit 24, e.g., via a pulse input-output switch 712, which includes ports 714 and switching circuitry 716. For example, the pulse out unit 38 of host device 1 is connected to one of the ports 714 of the pulse input-output switch 712 via one of the connectors 710, the pulse out unit 38 of host device 2 is connected to another one of the ports 714 of the pulse input-output switch 712 via another one of the connectors 710, and the pulse out unit 38 of host device 3 is connected to yet another one of the ports 714 of the pulse input-output switch 712 via yet another one of the connectors 710. A further one of the ports 714 of the pulse input-output switch 712 is connected to pulse input unit 24 of the peripheral device 704 via a further one of the connectors 710. The switching circuitry 716 is connected to each of the ports 714 and may be used to configure the connections between the ports 714 so that pulses received from the pulse out units 38 of host devices 702 are forwarded or passed to pulse input unit 24 of the peripheral device 704.

The pulse out unit 38 of each host device 702 is configured to output periodic pulses indicative of the follower clock value of the respective host device 702 to the pulse input unit 24 via the respective connectors 710 and typically via the pulse input-output switch 712, responsively to the follower clock value of the respective host device 702 being equal to given clock values. The pulse input-output switch 712 is configured to receive the periodic pulses output by the pulse output unit 38 of each host device 702 and output (e.g., forward or pass) the received periodic pulses to the pulse input unit 24 of the peripheral device 704.

In order to allow the peripheral device 704 to identify which host devices 702 has sent which periodic pulse 48, in some embodiments, the pulse output unit of each host device 704 is configured to time the output of the periodic pulses 48 in a round-robin manner (for example) with respect to other ones of the host devices 704. For example, host device 1 outputs a pulse when its clock time is equal to 08:00:00, host device 2 outputs a pulse when its clock time is equal to 08:00:01, host device 3 outputs a pulse when its clock time is equal to 08:00:02, and so on.

In other embodiments, the pulse-input-output switch 712 is configured to select from the periodic pulses output by the hosts devices 702 in a round-robin manner for output to the pulse input unit 24 so that the host devices 702 do not need to time output of the pulses in a round-robin manner (for example).

In FIG. 7, the pulse-input-output switch 712 is shown as a standalone device disposed between the host devices 702 and the peripheral device 704.

Figure 8:
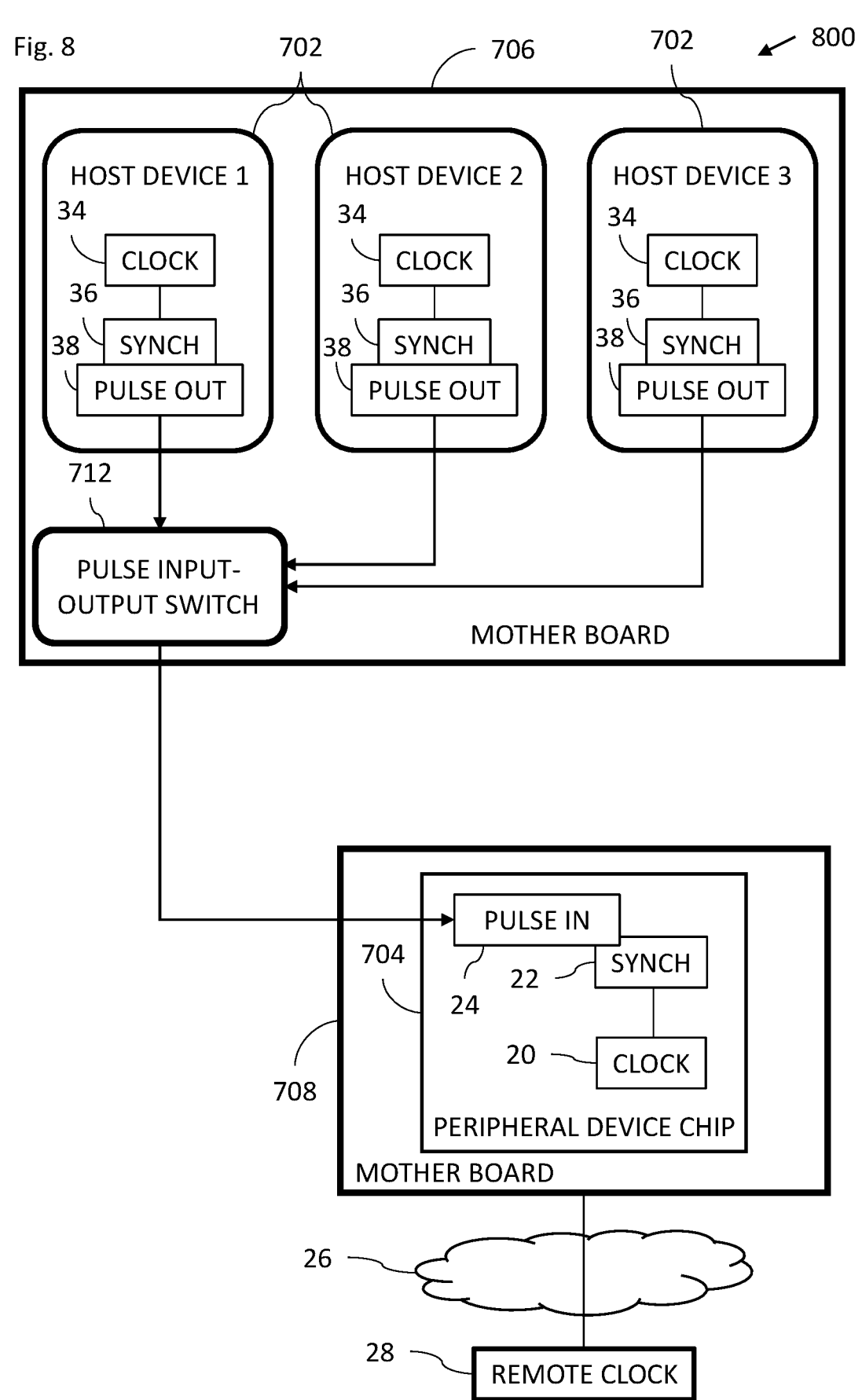
FIG. 8 is a block diagram view of a second multi-host clock synchronization and monitoring system constructed and operative in accordance with an embodiment of the present invention.

Reference is now made to FIG. 8, which is a block diagram view of a second multi-host clock synchronization and monitoring system 800 constructed and operative in accordance with an embodiment of the present invention. The system 800 is substantially the same as the system 700 of FIG. 7 except that the pulse input-output switch 712 is disposed on the motherboard 706 of the host devices 702.

Figure 9:
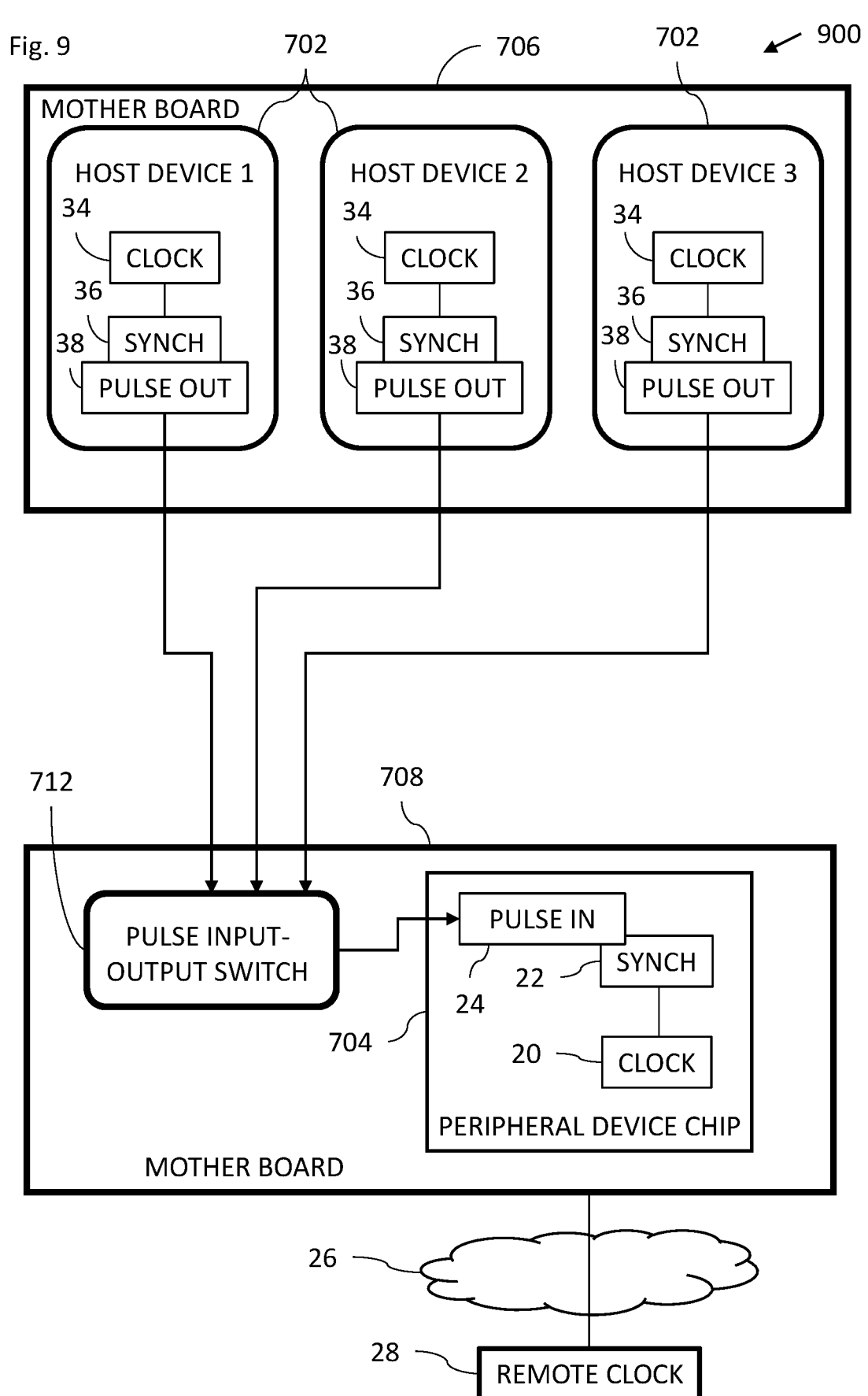
FIG. 9 is a block diagram view of a third multi-host clock synchronization and monitoring system constructed and operative in accordance with an embodiment of the present invention.

Reference is now made to FIG. 9, which is a block diagram view of a third multi-host clock synchronization and monitoring system 900 constructed and operative in accordance with an embodiment of the present invention. The system 900 is substantially the same as the system 700 of FIG. 7 except that the pulse input-output switch 712 is disposed on the motherboard 708 of the peripheral device 704.

Figure 10:
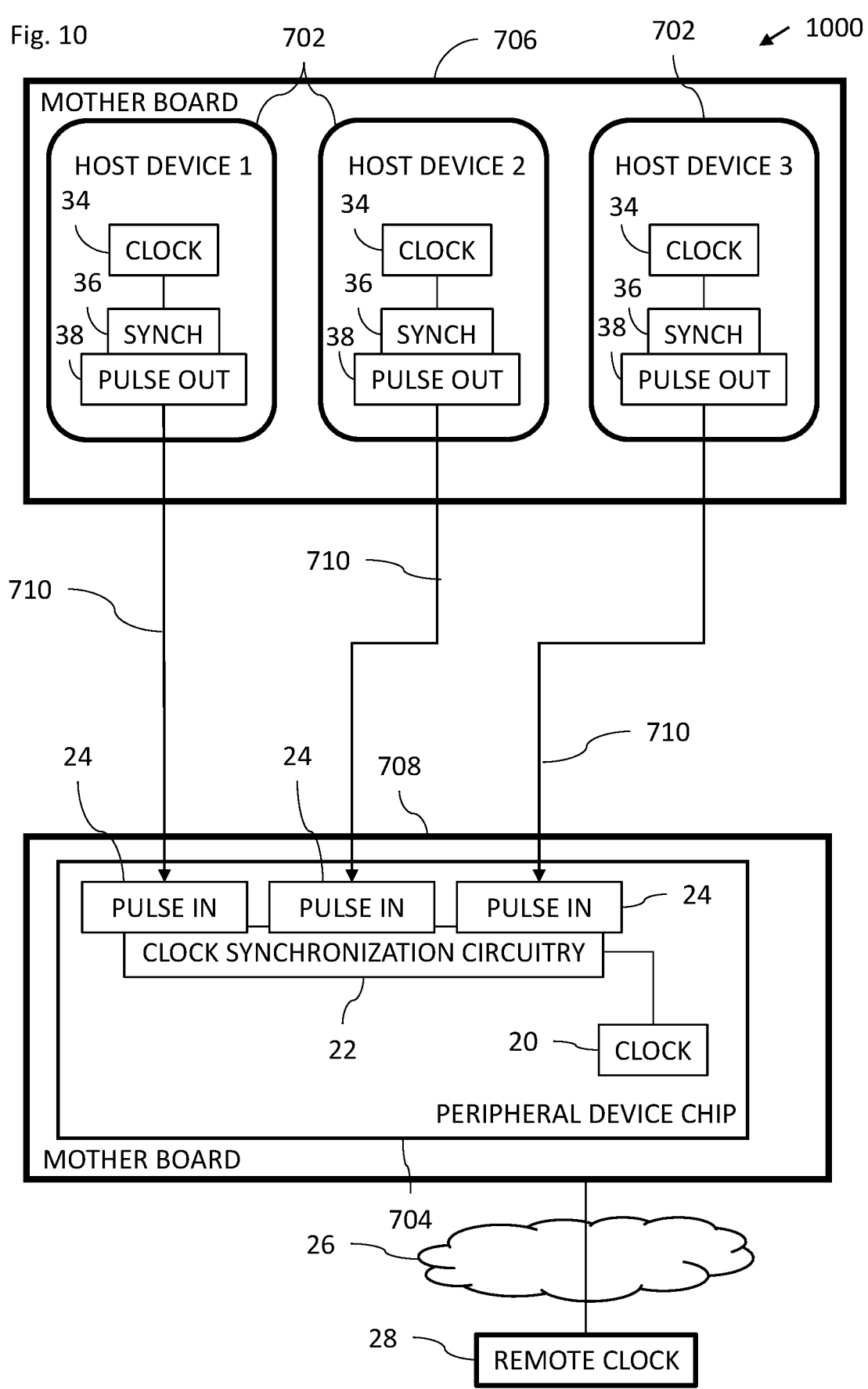
FIG. 10 is a block diagram view of a fourth multi-host clock synchronization and monitoring system constructed and operative in accordance with an embodiment of the present invention.

Reference is now made to FIG. 10, which is a block diagram view of a fourth multi-host clock synchronization and monitoring system 1000 constructed and operative in accordance with an embodiment of the present invention.

The system 1000 is substantially the same as the system 700 of FIG. 7 except for the following differences. The system 1000 does not need to include the pulse input-output switch 712.

The peripheral device 704 includes multiple pulse input units 24. A respective one of the connectors 710 is configured to connect the pulse output unit 38 of each host device 702 to a respective one of the pulse input units 24. For example, the pulse out unit 38 of host device 1 is connected to one of the pulse input units 24 via one of the connectors 710, the pulse out unit 38 of host device 2 is connected to another one of the pulse input units 24 via another one of the connectors 710, and the pulse out unit 38 of host device 3 is connected to yet another one of the pulse input units 24 via yet another one of the connectors 710.

The pulse out unit 38 of each host device 702 is configured to output periodic pulses indicative of the follower clock value of the respective host device 702 to the respective pulse input unit 24 via the respective connector 710, responsively to the follower clock value of the respective host device 702 being equal to given clock values. For example, the pulse out unit 38 of host device 1 is configured to output periodic pulses indicative of the clock value of host device 1 to one of the pulse input units 24 via one of the connectors 710 responsively to the clock value of host device 1 being equal to given clock values. Similarly, the pulse out unit 38 of host device 2 is configured to output periodic pulses indicative of the clock value of host device 2 to another one of the pulse input units 24 via another one of the connectors 710 responsively to the clock value of host device 2 being equal to given clock values, and so on.

Figure 11:
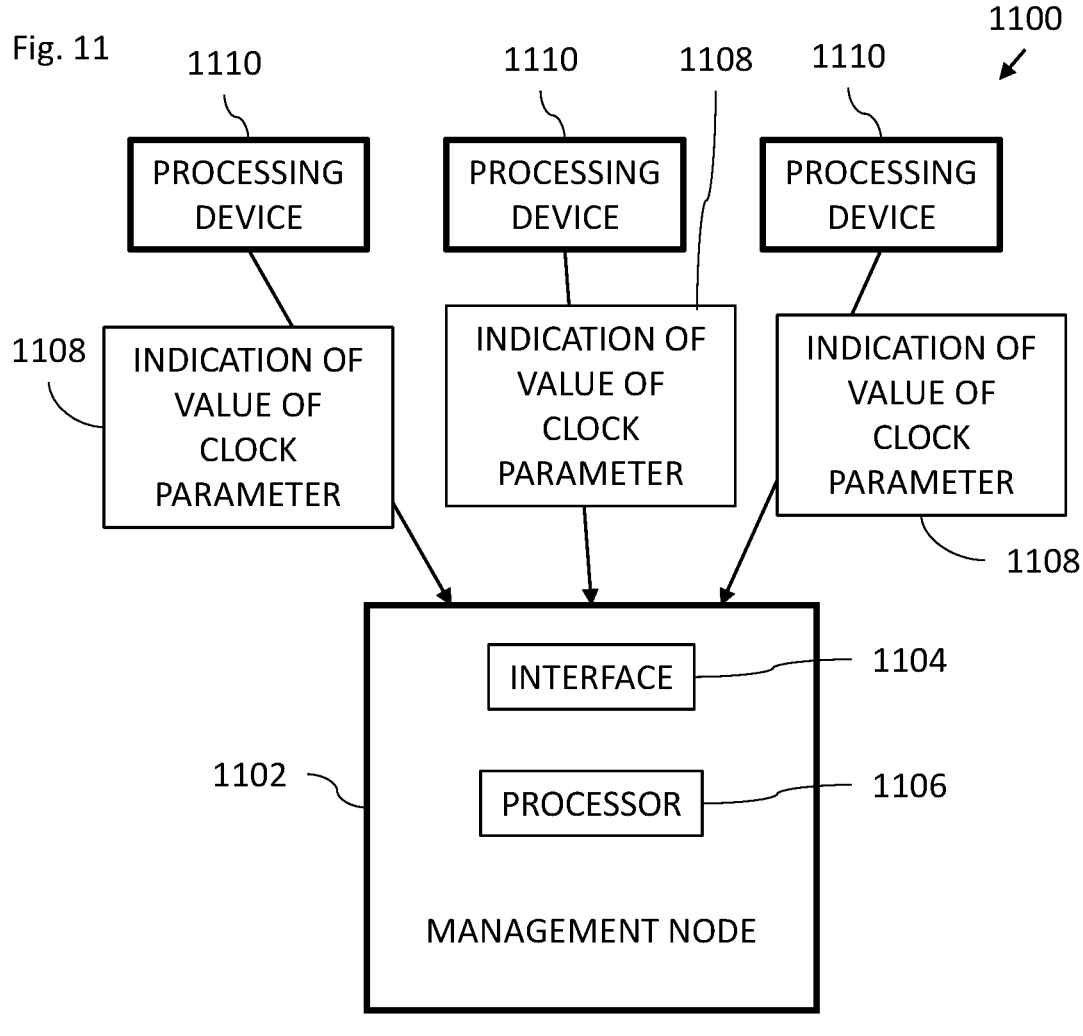
FIG. 11 is a block diagram view of a clock parameter monitoring system constructed and operative in accordance with an embodiment of the present invention.
Figure 12:
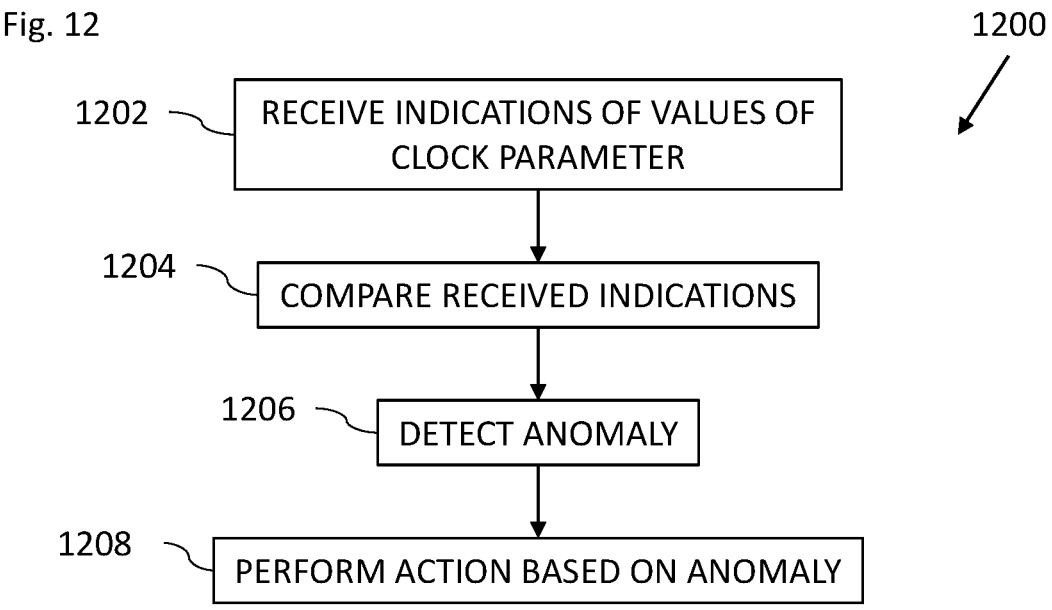
FIG. 12 is a flowchart including steps in a method of operation of the system of FIG. 11.

Reference is now made to FIGS. 11 and 12. FIG. 11 is a block diagram view of a clock parameter monitoring system 1100 constructed and operative in accordance with an embodiment of the present invention. FIG. 12 is a flowchart 1200 including steps in a method of operation of the system of FIG. 11.

The system 1100 includes a management node 1102, which includes an interface 1104 and a processor 1106. The interface 1104 may be a network interface and/or a data communication bus interface.

The interface 1104 is configured to receive indications 1108 of values of a clock parameter from processing devices 1110 (block 1202). The clock parameter may be selected from the following: a clock time of a hardware clock of one of the processing devices 1110 being monitored, a clock frequency of a hardware clock of one of the processing devices 1110 being monitored, a stability of a hardware clock of one of the processing devices 1110 being monitored, a filtered noise metric of a hardware clock of one of the processing devices 1110 being monitored, and/or an unfiltered noise metric of a hardware clock of one of the processing devices 1110 being monitored. The indications 1108 may be received directly from the processing devices 1110 or via one or more intermediate devices.

The processor 1106 is configured to: compare the received indications 1108 of the values of the clock parameter (block 1204); and detect an anomaly in a hardware clock of one of the processing devices 1110 responsively to comparing the received indications 1108 of the values of the clock parameter (block 1206); and perform an action based on detecting the anomaly (block 1208) such as blocking tracking of the processing device with the anomaly or de-scheduling tasks from the processing device with the anomaly. The anomaly may be detected by comparing the values of the clock parameters of the different devices and identifying a value (or values) which exceeds a given limit (e.g., percentage or standard deviation or other statistical measure) from the other received values. It should be noted that the management node 1102 may also compare the received indications 1108 with the clock parameter value(s) of the clock of the management node 1102, as in some cases the management node 1102 may have the clock with the anomaly. In some cases, more than one of the processing devices 1110 may be identified as having a clock with an anomaly.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system, comprising:
a follower processing device including:
    a follower hardware clock to maintain a follower clock value; and
    follower clock synchronization circuitry to: synchronize the follower hardware clock to a remote hardware clock; and provide an indication about the follower hardware clock to a reference processing device; and
the reference processing device including:
    a reference hardware clock to maintain a reference clock value; and
    reference clock synchronization circuitry, wherein:
the follower clock synchronization circuitry includes a pulse output unit to output periodic pulses indicative of the follower clock value to the reference processing device; and
the reference clock synchronization circuitry is to receive one of the periodic pulses from the pulse input unit and sample the reference clock value responsively to receiving the one periodic pulse to monitor a quality of synchronization of the follower hardware clock.

2. The system according to claim 1, wherein the reference clock synchronization circuitry is configured to monitor the quality of the synchronization of the follower hardware clock responsively to the provided indication about the follower hardware clock.

3. The system according to claim 1, wherein the follower hardware clock is not synchronized to the reference hardware clock.

4. The system according to claim 1, wherein the indication is a value of a clock parameter of the follower hardware clock, the clock parameter including one or more of the following: a clock time of the follower hardware clock; a clock frequency of the follower hardware clock; a stability of the follower hardware clock, a filtered noise metric of the follower hardware clock; and/or an unfiltered noise metric of the follower hardware clock.

5. The system according to claim 1, wherein the reference clock synchronization circuitry is configured to discipline the reference hardware clock responsively to a remote clock.

6. The system according to claim 1, wherein the follower clock synchronization circuitry is configured to synchronize the follower hardware clock to the reference hardware clock using a given clock synchronization method, and the reference clock synchronization circuitry is configured to monitor the quality of the synchronization of the follower hardware clock independently of the given clock synchronization method.

7. The system according to claim 1, further comprising data communication bus connecting the reference processing device and the follower processing device.

8. The system according to claim 7, wherein the reference clock synchronization circuitry and the follower clock synchronization circuitry are configured to exchange clock synchronization messages in order to synchronize the follower hardware clock to the reference hardware clock.

9. The system according to claim 1, further comprising a connector, wherein:
    the reference processing device includes a pulse input unit;
    the connector is configured to connect the pulse output unit to the pulse input unit; and
    the pulse output unit is configured to output the periodic pulses indicative of the follower clock value to the pulse input unit via the connector, responsively to the follower clock value being equal to given clock values.

10. The system according to claim 9, wherein the reference clock synchronization circuitry is configured to send the sampled reference clock value to the follower processing device or to a management node.

11. The system according to claim 10, wherein the follower processing device or the management node comprises a processor to:
    determine if a clock drift of the follower clock value from the reference clock value exceeds a limit responsively to the sampled reference clock value; and
    perform an action responsively to the clock drift exceeding the limit.

12. The system according to claim 9, wherein the reference clock synchronization circuitry is configured to:
    determine if a clock drift of the follower clock value from the reference clock value exceeds a limit responsively to the sampled reference clock value; and
    send a request to the follower processing device or to a management node to perform an action responsively to the clock drift exceeding the limit.

13. The system according to claim 9, wherein the reference clock synchronization circuitry is configured to:

determine if a clock drift of the follower clock value from the reference clock value exceeds a limit responsively to the sampled reference clock value; and perform an action responsively to the clock drift exceeding the limit.

14. The system according to claim 13, wherein the reference processing device includes packet processing circuitry, which is configured to block a flow of packets from the follower processing device responsively to the clock drift exceeding the limit.

15. The system according to claim 9, wherein the follower clock synchronization circuitry is configured to provide time-of-day (TOD) messages to the reference clock synchronization circuitry, which is configured to determine if a clock drift of the follower clock value from the reference clock value exceeds a limit responsively to the sampled reference clock value and at least one of the time-of-day messages.

16. The system according to claim 15, wherein the follower clock synchronization circuitry is configured to provide the time-of-day messages at a frequency greater than two times a frequency of the periodic pulses.

17. The system according to claim 15, wherein the follower clock synchronization circuitry is configured to provide the time-of-day messages periodically.

18. The system according to claim 1, wherein the reference clock synchronization circuitry is configured to receive the indication from the follower processing device and sample the reference clock value responsively to receiving the indication.

19. The system according to claim 18, wherein the reference clock synchronization circuitry is configured to send the sampled reference clock value to the follower processing device or to a management node.

20. The system according to claim 19, wherein the follower processing device or the management node comprises a processor to:

determine if a clock drift of the follower clock value from the reference clock value exceeds a limit responsively to the sampled reference clock value; and perform an action responsively to the clock drift exceeding the limit.

21. The system according to claim 18, wherein the reference clock synchronization circuitry is configured to:

determine if a clock drift of the follower clock value from the reference clock value exceeds a limit responsively to the sampled reference clock value; and send a request to the follower processing device or to a management node to perform an action responsively to the clock drift exceeding the limit.

22. The system according to claim 18, wherein the reference clock synchronization circuitry is configured to:

determine if a clock drift of the follower clock value from the reference clock value exceeds a limit responsively to the sampled reference clock value; and perform an action responsively to the clock drift exceeding the limit.

23. The system according to claim 1, wherein the follower processing device comprises a central processing unit (CPU) or a graphics processing unit (GPU).

24. The system according to claim 1, wherein the follower processing device and the reference processing device are comprised in a network switch comprising packet processing circuitry and a central processing unit (CPU).

25. The system according to claim 1, wherein the reference processing device includes any one or more of the following: a network device to be connected to a network and connect to the remote clock over the network; a network interface controller to be connected to the network and connect to the remote clock over the network; a network switch to connect to the remote clock over the network; and a timecard to be connected to a satellite time source, which is the remote clock.

26. A system, comprising:

a peripheral device including:

a reference hardware clock to maintain a reference clock value; and reference clock synchronization circuitry; and multiple host devices, each host device including:

a follower hardware clock to maintain a follower clock value; and follower clock synchronization circuitry to: synchronize the follower hardware clock of a respective one of the host devices to a remote hardware clock; and provide an indication about the follower clock value of the respective host device to the reference processing device, wherein:

the follower clock synchronization circuitry of each host device includes a pulse output unit to output periodic pulses indicative of the follower clock value of the respective host device to the peripheral device; and the reference clock synchronization circuitry is to receive one of the periodic pulses from the pulse input unit of each host device and sample the reference clock value responsively to receiving the one periodic pulse of each host device to monitor a quality of synchronization of the follower hardware clock of each host device responsively to the one periodic pulse of each host device.

27. The system according to claim 26, further comprising connectors, wherein:

the peripheral device includes a pulse input unit;

a respective one of the connectors is configured to connect the pulse output unit of each host device to the pulse input unit; and the pulse output unit of each host device is configured to output the periodic pulses indicative of the follower clock value of the respective host device to the pulse input unit via the respective connector, responsively to the follower clock value of the respective host device being equal to given clock values.

28. The system according to claim 27, wherein the pulse output unit of each host device is configured to time the output of the periodic pulses in a round-robin manner with respect to other ones of the host devices.

29. The system according to claim 27, further comprising a pulse input-output switch to receive the periodic pulses output by the pulse output unit of each host device and output the received periodic pulses to the pulse input unit.

30. The system according to claim 29, wherein the pulse-input-output switch is configured to select from the periodic pulses output by the hosts devices in a round-robin manner for output to the pulse input unit.

31. The system according to claim 29, wherein the pulse-input-output switch is: disposed on a mother board of the host devices; or disposed on a mother board of the peripheral device; or a standalone device disposed between the host devices and the peripheral device.

32. The system according to claim 26, further comprising connectors, wherein:

the peripheral device includes multiple pulse input units;

a respective one of the connectors is configured to connect the pulse output unit of each host device to a respective one of the pulse input units; and the pulse output unit of each host device is configured to output the periodic pulses indicative of the follower clock value of the respective host device to the respective pulse input unit via the respective connector, responsively to the follower clock value of the respective host device being equal to given clock values.

33. A method, comprising:

maintaining a reference clock value;

maintaining a follower clock value;

synchronizing a follower hardware clock to a remote hardware clock;

providing an indication about the follower hardware clock to a reference processing device; and monitoring a quality of synchronization of the follower hardware clock;

outputting periodic pulses indicative of the follower clock value to the reference processing device;

receiving one of the periodic pulses by the reference processing device; and sampling the reference clock value responsively to receiving the one periodic pulse to monitor a quality of synchronization of the follower hardware clock.

\* \* \* \* \*